(12) United States Patent
Gilbert et al.

(10) Patent No.: US 10,180,303 B2
(45) Date of Patent: Jan. 15, 2019

(54) LOCKABLE GUN STORAGE CONTAINER

(71) Applicants: Zachary Gilbert, Auburn, WA (US); Robert E Gilbert, Carnation, WA (US)

(72) Inventors: Zachary Gilbert, Auburn, WA (US); Robert E Gilbert, Carnation, WA (US)

( * ) Notice: Subject to any disclaimer, the term of this patent is extended or adjusted under 35 U.S.C. 154(b) by 0 days.

(21) Appl. No.: 15/687,122

(22) Filed: Aug. 25, 2017

(65) Prior Publication Data

US 2018/0058812 A1 Mar. 1, 2018

Related U.S. Application Data

(60) Provisional application No. 62/379,465, filed on Aug. 25, 2016.

(51) Int. Cl.

| F41C 33/06 | (2006.01) |
|---|---|
| B60R 7/14 | (2006.01) |
| B62J 11/00 | (2006.01) |
| F41C 33/04 | (2006.01) |
| B65D 25/10 | (2006.01) |
| B65D 43/16 | (2006.01) |
| B65D 43/22 | (2006.01) |
| B62J 9/00 | (2006.01) |

(52) U.S. Cl.
CPC ............ *F41C 33/045* (2013.01); *B62J 9/008* (2013.01); *B65D 25/10* (2013.01); *B65D 43/163* (2013.01); *B65D 43/22* (2013.01); *F41C 33/041* (2013.01); *F41C 33/06* (2013.01); *B60R 7/14* (2013.01); *B62J 11/00* (2013.01); *Y10S 224/912* (2013.01)

(58) Field of Classification Search
CPC ........ F41C 33/06; Y10S 224/912; B60R 7/14; Y10T 70/5031; B62J 11/00
USPC .......................... 224/413, 912, 569; 206/317
See application file for complete search history.

(56) References Cited

U.S. PATENT DOCUMENTS

| 1,430,081 | A | | 9/1922 | Holler | |
|---|---|---|---|---|---|
| 1,557,339 | A | | 10/1925 | Sander | |
| 2,557,048 | A | | 6/1951 | Haase | |
| 3,464,606 | A | | 9/1969 | Nordeen | |
| 3,806,010 | A | * | 4/1974 | Utigard | B62J 9/00 224/413 |
| 4,309,065 | A | * | 1/1982 | Pappas | A47B 81/005 224/912 |
| 4,721,205 | A | | 1/1988 | Burt et al. | |
| 4,800,822 | A | | 1/1989 | Adkins | |
| 5,056,342 | A | * | 10/1991 | Prinz | A47C 21/00 109/51 |
| 5,118,175 | A | * | 6/1992 | Costello | F41C 33/06 206/317 |
| 5,168,994 | A | * | 12/1992 | Beletsky | F41C 33/06 206/317 |

(Continued)

*Primary Examiner* — Justin Larson
(74) *Attorney, Agent, or Firm* — Dean A. Craine, P.S.

(57) ABSTRACT

A locking gun storage container with a main box, a biased lid mounted on one end of the main box, and a lock mechanism that selectively locks the lid in a closed position. Inside the interior cavity of the main box is a holster with an interior pocket configured to hold a handgun. The holster includes an upper edge attached to a first hinge assembly mounted to the inside surface of the lid and a lower edge attached to a second hinge assembly attached to the inside surface of the main box. The two hinge assemblies are configured to hold and support the holster when holding a handgun upright over the interior cavity of the main box when the lid is opened and then repositioned the holster inside the interior cavity when the lid is closed. Mounted on the main box a coupler that selectively attaches to an external mount.

5 Claims, 10 Drawing Sheets

(56) References Cited

U.S. PATENT DOCUMENTS

| | | | | |
|---|---|---|---|---|
| 5,511,711 A * | 4/1996 | Kunz | ............... | B60R 7/14 |
| | | | | 224/539 |
| 5,671,830 A * | 9/1997 | Wood | ............... | A45C 13/02 |
| | | | | 150/101 |
| 5,778,805 A * | 7/1998 | Green | ............... | E05B 65/0075 |
| | | | | 109/51 |
| 5,916,087 A * | 6/1999 | Owens | ............... | F41A 23/18 |
| | | | | 224/243 |
| 6,082,601 A * | 7/2000 | Standish | ............... | B60R 7/14 |
| | | | | 206/317 |
| 6,405,861 B1 | 6/2002 | Siler et al. | | |
| 6,974,059 B2 * | 12/2005 | Alderman | ............... | B62H 5/001 |
| | | | | 224/413 |
| 7,143,913 B2 * | 12/2006 | Lindsey | ............... | B62J 11/00 |
| | | | | 224/413 |
| 8,752,745 B2 | 6/2014 | Bond et al. | | |
| 8,826,704 B1 * | 9/2014 | Marshall | ............... | E05G 1/10 |
| | | | | 109/50 |
| 8,919,624 B2 * | 12/2014 | Visenzi | ............... | B62J 9/008 |
| | | | | 224/413 |
| 8,931,422 B2 * | 1/2015 | Heim | ............... | F41C 33/06 |
| | | | | 109/45 |
| 9,650,096 B2 | 5/2017 | Visenzi | | |
| 2003/0057122 A1 | 3/2003 | Bushnell et al. | | |
| 2004/0031833 A1 * | 2/2004 | Alderman | ............... | B62H 5/001 |
| | | | | 224/413 |
| 2004/0238581 A1 * | 12/2004 | Lindsey | ............... | B62J 11/00 |
| | | | | 224/413 |
| 2014/0116303 A1 * | 5/2014 | Mothersele | ............... | F41C 33/06 |
| | | | | 109/64 |
| 2018/0058812 A1 * | 3/2018 | Gilbert | ............... | F41C 33/041 |

* cited by examiner

LOCKABLE GUN STORAGE CONTAINER

This utility patent application is based on and claims the filing date benefit of U.S. provisional patent application (Application No. 62/379,465), filed on Aug. 25, 2016.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

Field of the Invention

This invention pertains to handgun storage boxes, and more particularly, to handgun storage boxes designed to store a handgun that automatically arranges the handgun in a position of readiness when the storage box is opened.

Description of the Related Art

Many states in the U.S. are 'concealed carry' states that permit individuals to carry a concealed, loaded handgun in public on his or her person or in a vehicle operated by the person. If the loaded handgun is not being personally carried but instead being transported in a vehicle, many states require that the vehicle be locked when away from the vehicle or kept in a locked container.

When the owner is required to use a handgun stored in a locked storage container, it is desirable for the handgun to be vertically oriented with the handle extending upward and the barrel extending downward. Unfortunately, most storage containers are designed to be relatively small and compact and store the handgun horizontally. What is needed is a compact, lockable handgun storage container that automatically deploys the handgun in vertical orientation when the storage container is initially opened.

SUMMARY OF THE INVENTION

Disclosure herein is a portable, locking gun storage container configured to automatically hold a handgun in a compact, flat horizontal orientation inside a lockable storage container. The storage container includes a lid pivotally mounted over a main box. The lid is closed over the main box, the handgun is disposed horizontally inside the main box's interior cavity. When the lid is opened, the handgun is automatically repositioned in the interior cavity in a vertical, deployment position with the handgun's hand grip oriented vertically and the handgun's barrel is angled downward.

The storage enclosure includes a lock mechanism disposed between the main box and the lid that allows the user to selectively lock and unlock the lid from the main box. In one embodiment, a spring hinge is used to attach the lid to the main box that automatically swings the lid open when the locking mechanism is released.

Mounted inside the interior cavity of the main box is a holster with an interior pocket configured to receive a handgun. The holster includes an upper edge attached to a first hinge assembly mounted to the inside surface of the lid. The holster also includes a lower edge attached to a second hinge assembly attached to the inside surface of the main box. The two hinge assemblies are configured to hold the holster vertically upright inside the interior cavity when the lid is opened and hold the holster horizontally inside the interior cavity when the lid is closed. During use, a handgun is inserted into the holster with its barrel extending to the holster. The handgun's hand grip is located outside the holster.

Mounted on the bottom surface of the main box is a coupler configured to selectively attach to a compatible mount. The mount is attached to a mounting surface enabling the enclosure to be selectively attached or detached to the mounting surface. In one embodiment, the mounting surface is the top surface of a fuel tank on a motorcycle. The coupler is configured to extend around the fuel tank opening and conveniently hold and lock the storage container directly in front of the rider.

DESCRIPTION OF THE PREFERRED EMBODIMENT(S)

Referring to the Figs, there is shown a portable, locking gun storage container 10 configured to automatically hold a handgun 100 in a flat horizontal orientation inside a main box 12 when the lid 22 pivotally attached to the main box 12 is closed. When the lid 22 is opened, the handgun 100 is automatically repositioned to a vertical or near vertical orientation over the inside surface 19 of the main box 12 so the handgun's hand grip 102 is oriented vertically and upward and partially exposed from the end of a holster 80. The handgun's barrel 104 is pointed downward when the lid 22 is pivoted to an open position.

The storage container 10 includes a main box 12, a lid 22 pivotally mounted on one end of the main box 12, and a lock mechanism 39 disposed between the main box 12 and the lid 22 that allows the user to selectively lock and unlock the lid 22 from the main box 12. The main box 12 is a square or rectangular structure with a front surface panel 14, a left side panel 15, a rear panel 16, a right side panel 17 and a bottom panel 18. Formed inside the main box 12 is an interior cavity 19.

The rear surface of the lid 22 is attached to the main box's rear panel 16 by one or two hinges 30. In one embodiment, one or both hinges 30 include springs (not shown) that force the lid 22 into an open position when the lock mechanism 39 is unlocked. The lock mechanism 39 includes a moveable latch 37 that selectively moves in fore and aft directions to engage a slot 38 formed on the main box's front panel 14. The lock mechanism 39 may be controlled by a key, a key pad or a finger print touch sensor.

Figure 1:
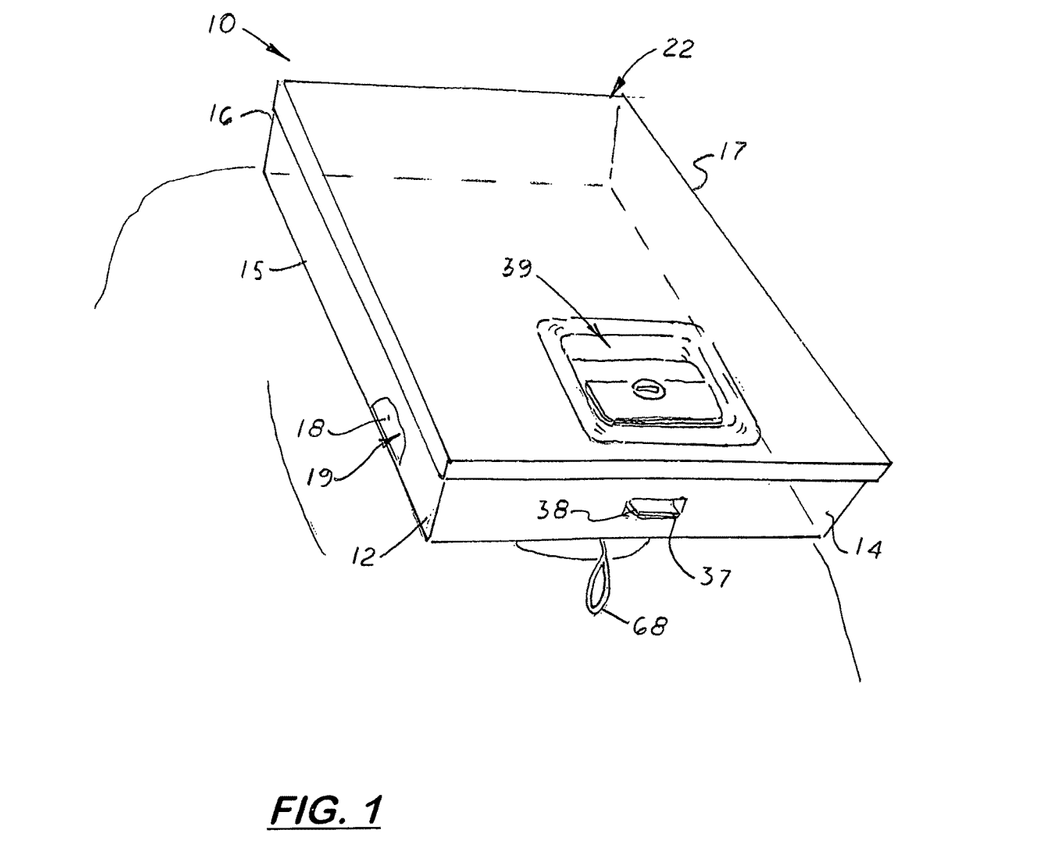
FIG. 1 is a top perspective view of a portable, locking gun storage container in a closed position and selectively mounted on a mounting surface.
Figure 2:
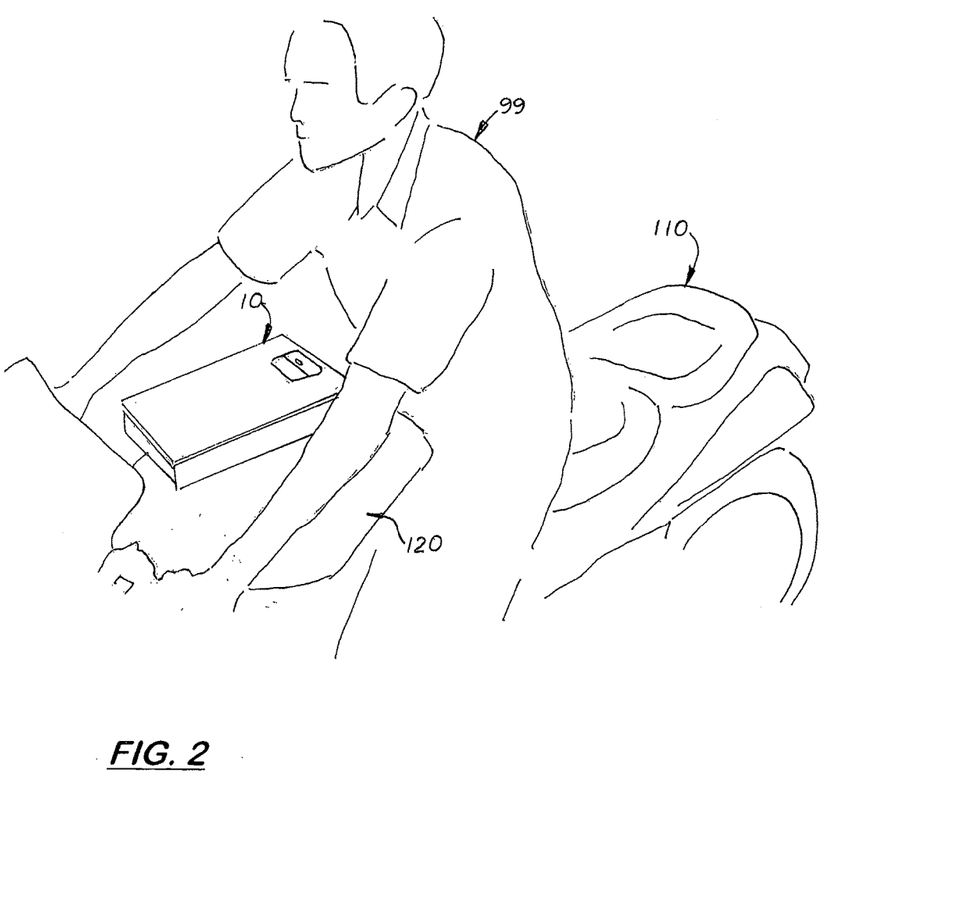
FIG. 2 is a top perspective view of a motorcycle rider sitting on a motorcycle with the portable locking gun storage container shown in FIG. 1 selectively mounted to the motorcycle's fuel tank.
Figure 3:
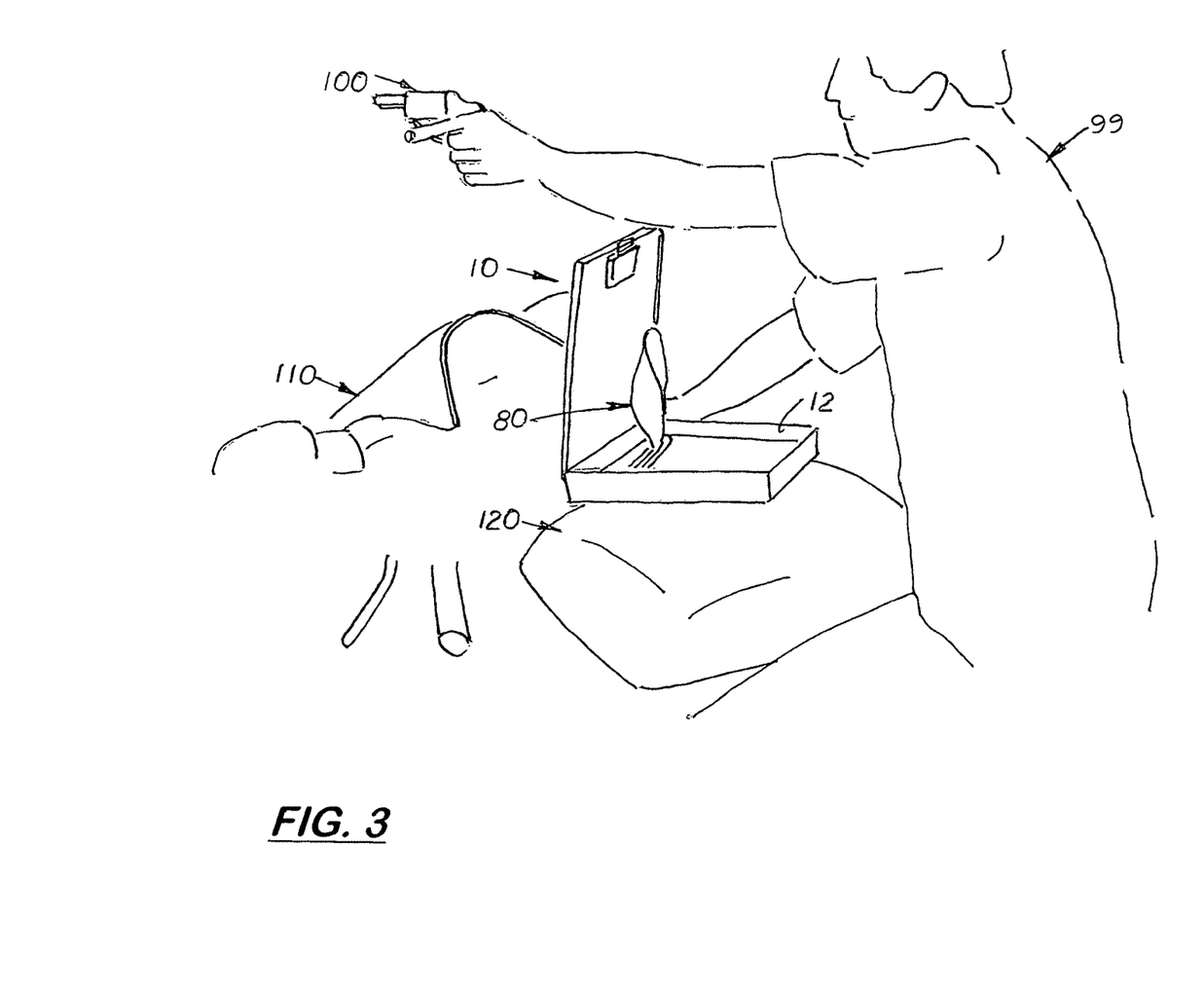
FIG. 3 is a side perspective view of the motorcycle and the rider in FIG. 2 showing the lid on the storage container pivoted to an open position, showing the handgun removed from the storage container and aimed with one hand while using the other hand operates the motorcycle.
Figure 4:
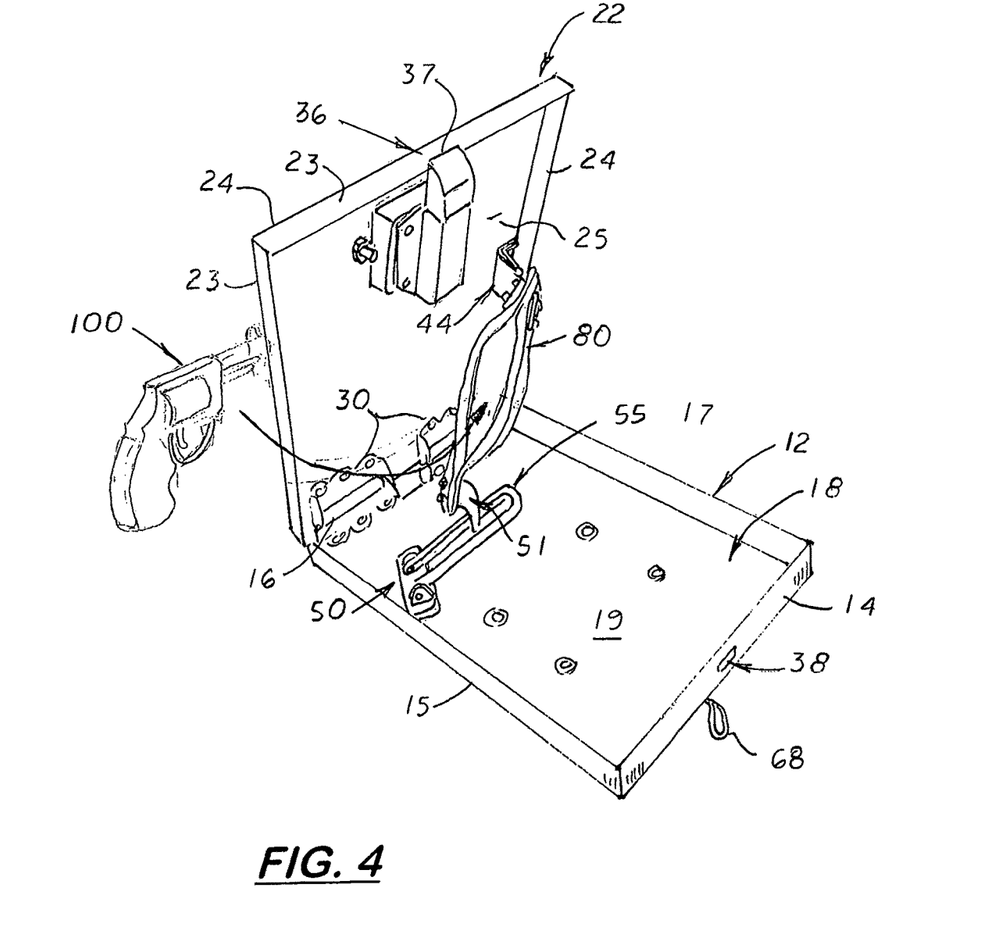
FIG. 4 is a perspective view of the storage container with the lid in an open position and showing the handgun being inserted into the holster.

The storage container 10 is lightweight, portable and designed to selectively attach to a mounting surface. In one embodiment shown in FIGS. 2, 3, 5, and 10, the mounting surface is the top surface of a fuel tank 120 on a motorcycle 110. FIG. 2 is a top perspective view of a motorcycle rider 99 sitting on a motorcycle 110 with the storage container 10 shown in FIG. 1 selectively mounted to the top surface of the motorcycle's fuel tank 120 and directly in front of the rider 99 when sitting on the motorcycle 110. FIG. 3 is a side perspective view of the motorcycle 110 showing the rider 99 pivoting the lid 22 on the storage container 10 to an open position, removing the handgun 100 from the main box 12 and aiming the handgun 100 with one hand while using the opposite hand to operate the motorcycle 110.

Mounted inside the interior cavity 19 of the main box 12 is a holster 80 with an interior pocket 94 configured to hold a standard handgun 100 with a handgrip 102 and a barrel 104. As shown in FIGS. 4-7, the holster 80 is made of two layers 82, 84 attached along their upper and lower edges 86, 88, respectively. Their side edges are detached thereby forming a main opening 90 and an opposite barrel opening 92 that both communicate with the interior pocket 94.

Figure 5:
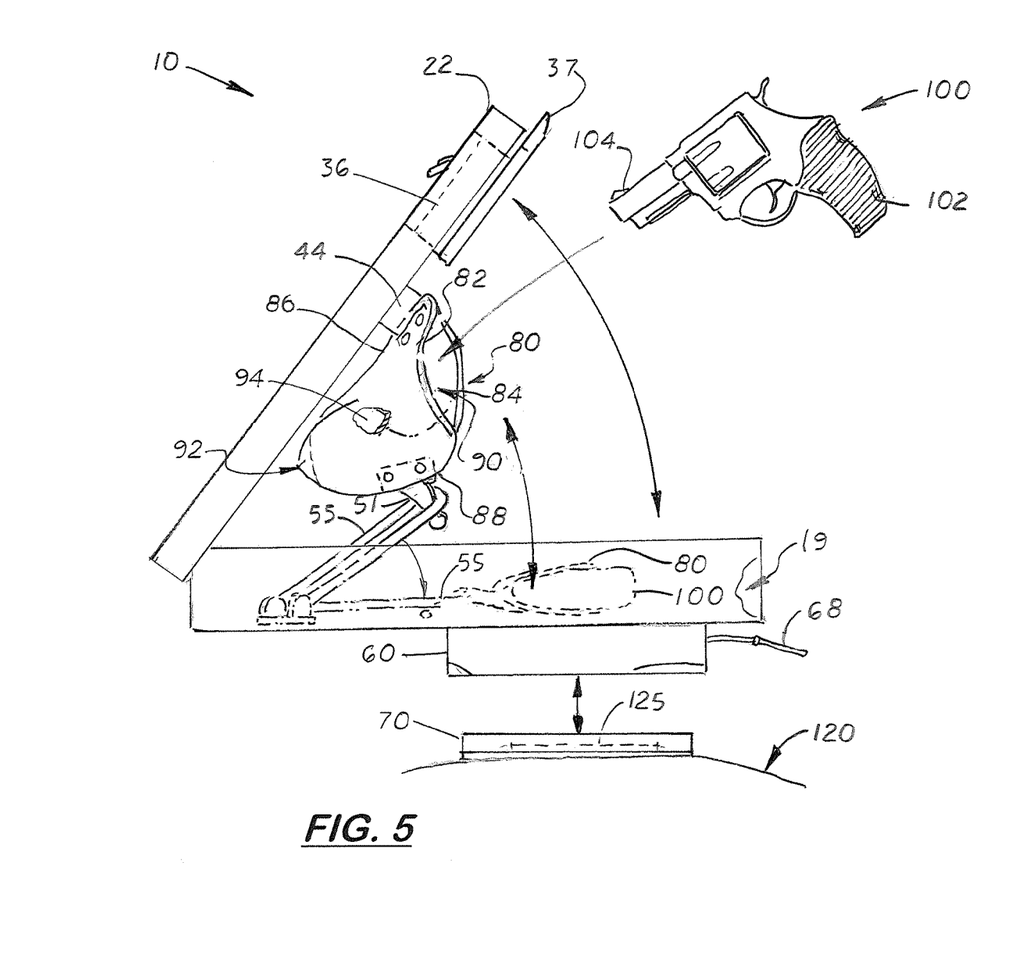
FIG. 5 is an illustration showing a side elevational view of the storage container with the lid in an opened position and the handgun being placed inside the holster.
Figure 7:
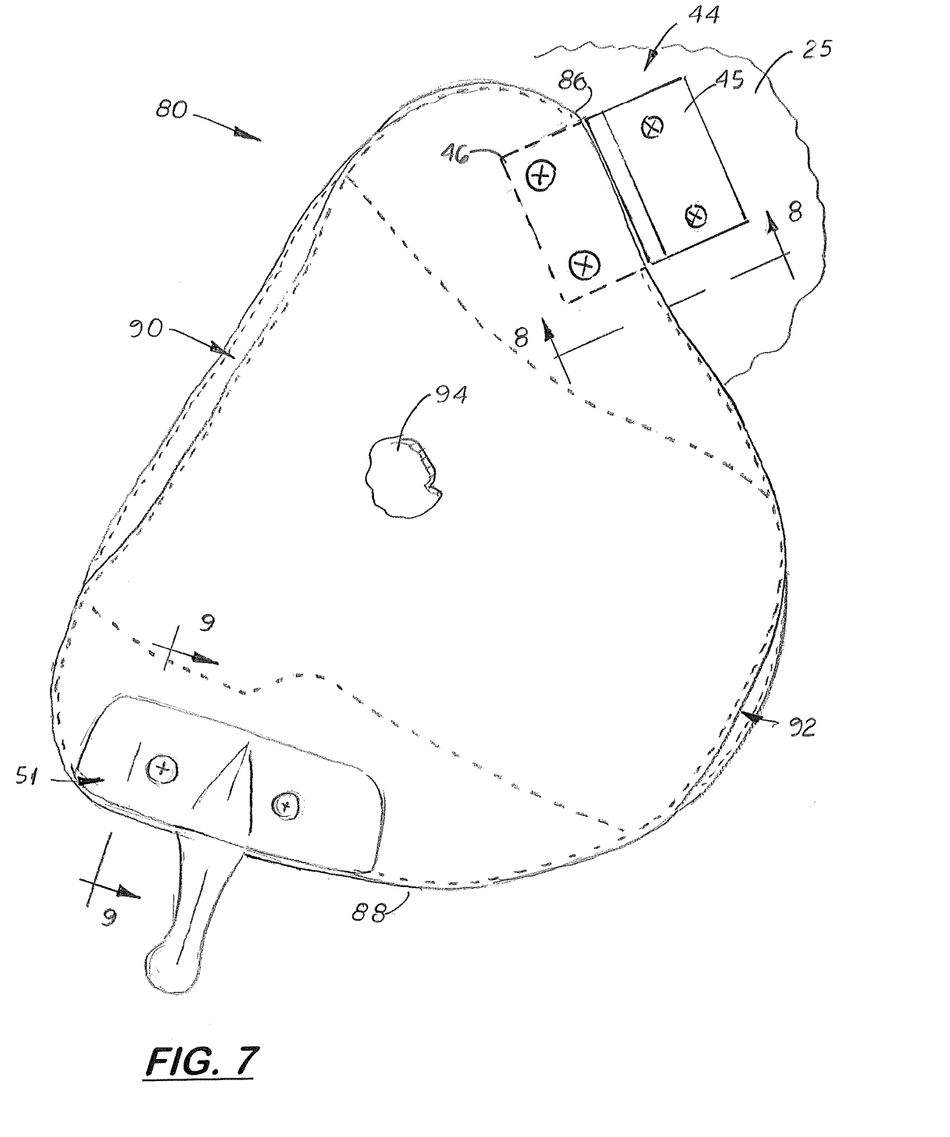
FIG. 7 is a side elevational view of the holster.
Figure 8:
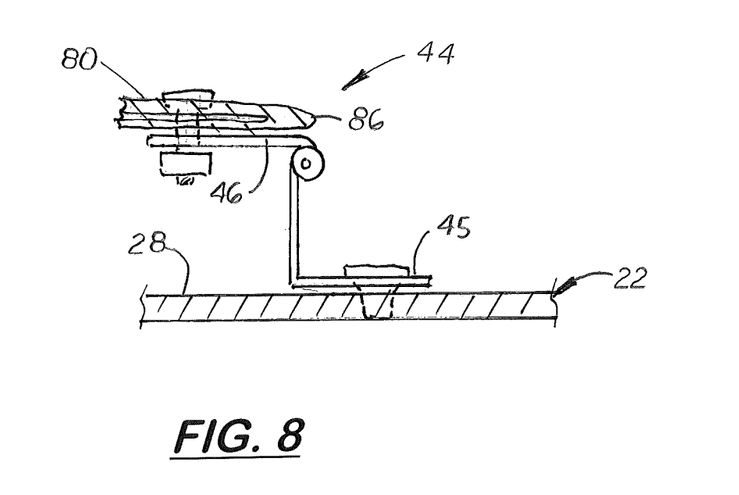
FIG. 8 is a sectional side elevational view taken along line 8-8 in FIG. 7.
Figure 9:
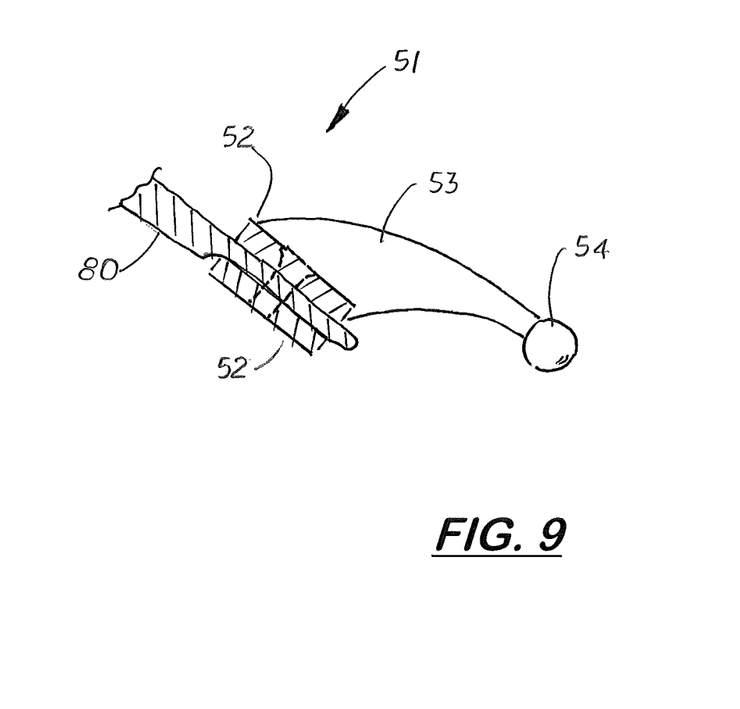
FIG. 9 is a sectional side elevational view taken along line 9-9 in FIG. 7.

Attached to the upper edge 86 of the holster 80 is a first hinge assembly 44 shown more clearly in FIGS. 7 and 8. The first hinge assembly 44 includes two pivotally attached leaves 45, 46. The first leave 45 is attached to the inside surface 25 of the lid 22 while the second leave 46 is attached to the outside surface of the upper section of the holster 80 adjacent to the upper edge 86. During operation, the first hinge assembly 44 enables the upper edge 86 of the holster 80 to rotate approximately 90 degrees over the inside surface 25 of the lid 22 as the lid 22 is rotated between opened and closed positions over the main box 12 as shown in FIGS. 2, 3 and 5.

Figure 6:
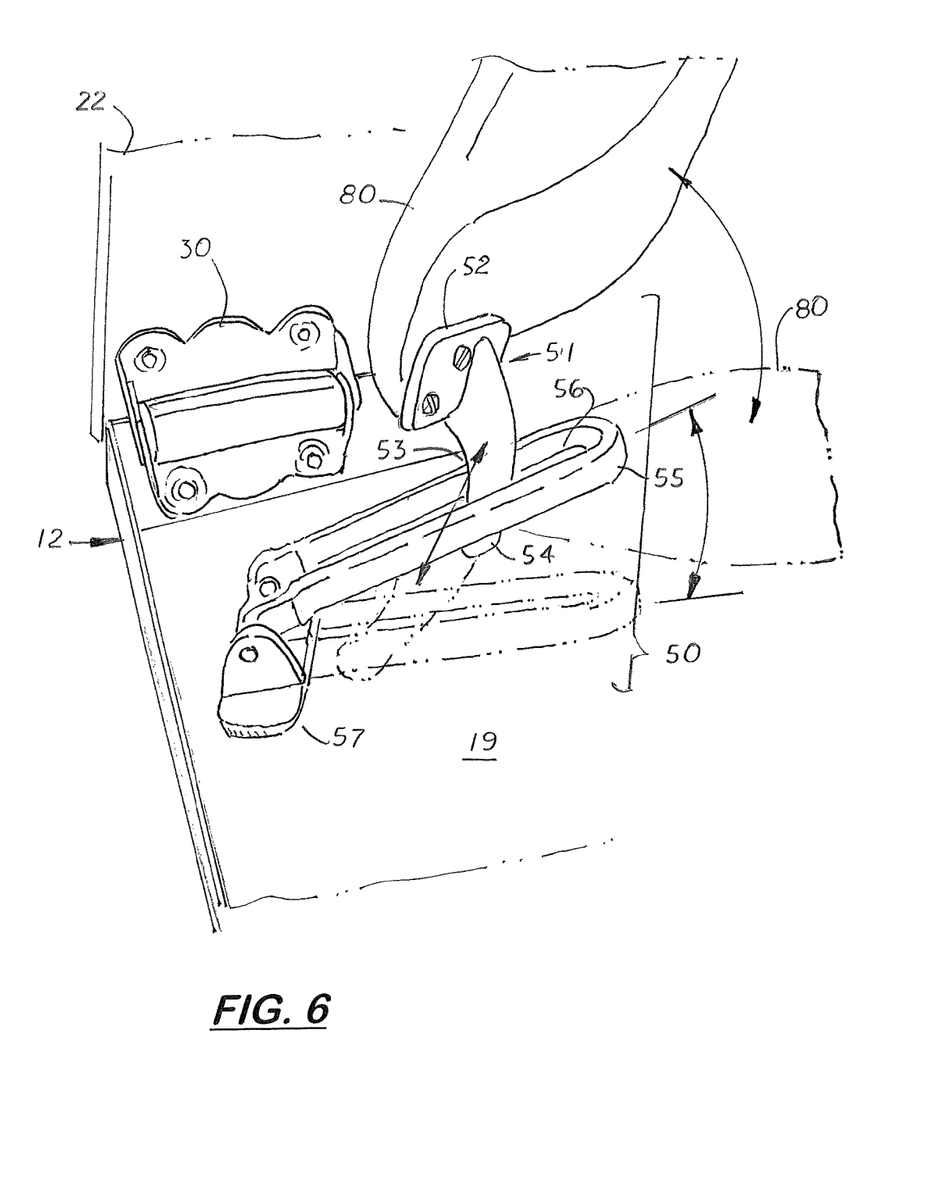
FIG. 6 is a partial top, perspective view showing the second hinge assembly mounted on the inside surface of the main box and attached to the lower edge of the holster.

A second hinge assembly 50 is attached to the inside surface of the bottom panel 18 on the main box 12 near the left side panel 15 of the main box 12 opposite the first hinge assembly 44. As shown in FIG. 6, the second hinge assembly 50 includes an elongated latch keeper 55 pivotally attached to a hinge plate 57. The hinge plate 57 is attached to the inside surface of the bottom panel 18. The latch keeper 55 is closed at one end and includes an elongated, longitudinally aligned slot 56. The hinge plate 57 enables the latch keeper 55 to freely pivot approximately 90 degrees over the main box 12.

Attached to the lower edge 88 of the holster 80 is a guide hook 51. The guide hook 51 includes a base 52 and an upper extending, narrow arc member 53 configured to slide freely inside the slot 56 formed on the latch keeper 55. Formed on the end of the arc member 53 is a ball stop 54. During assembly, the base 52 is attached to the lower section of the holster 80 near the holster's lower edge 88. The arc member 53 is inserted into the slot 56 and the ball stop 54 is positioned on the opposite side of the latch keeper 55 to connect the guide hook 51 to the latch keeper 55. During use, the guide hook 51 slides back and forth along the slot 56 to re-position the holster 80 vertically and horizontally as the lid 22 opens and closes, respectively.

When the lid 22 is closed, the holster 80 and the handgun 100 are oriented substantially horizontally (+/−0 to 6 degrees from the main box's longitudinal axis) inside the main box 12. When the lid 22 is opened, the holster 80 and the handgun 100 are disposed substantially vertically (+/−0 to 15 degrees from the axis line aligned perpendicular to the main box's longitudinal axis. The holster 80 is angled rearward so that the handgun's barrel 104 is aligned diagonally downward at approximately 60 degrees from the storage box's vertical axis when placed into the holster 80.

Figure 10:
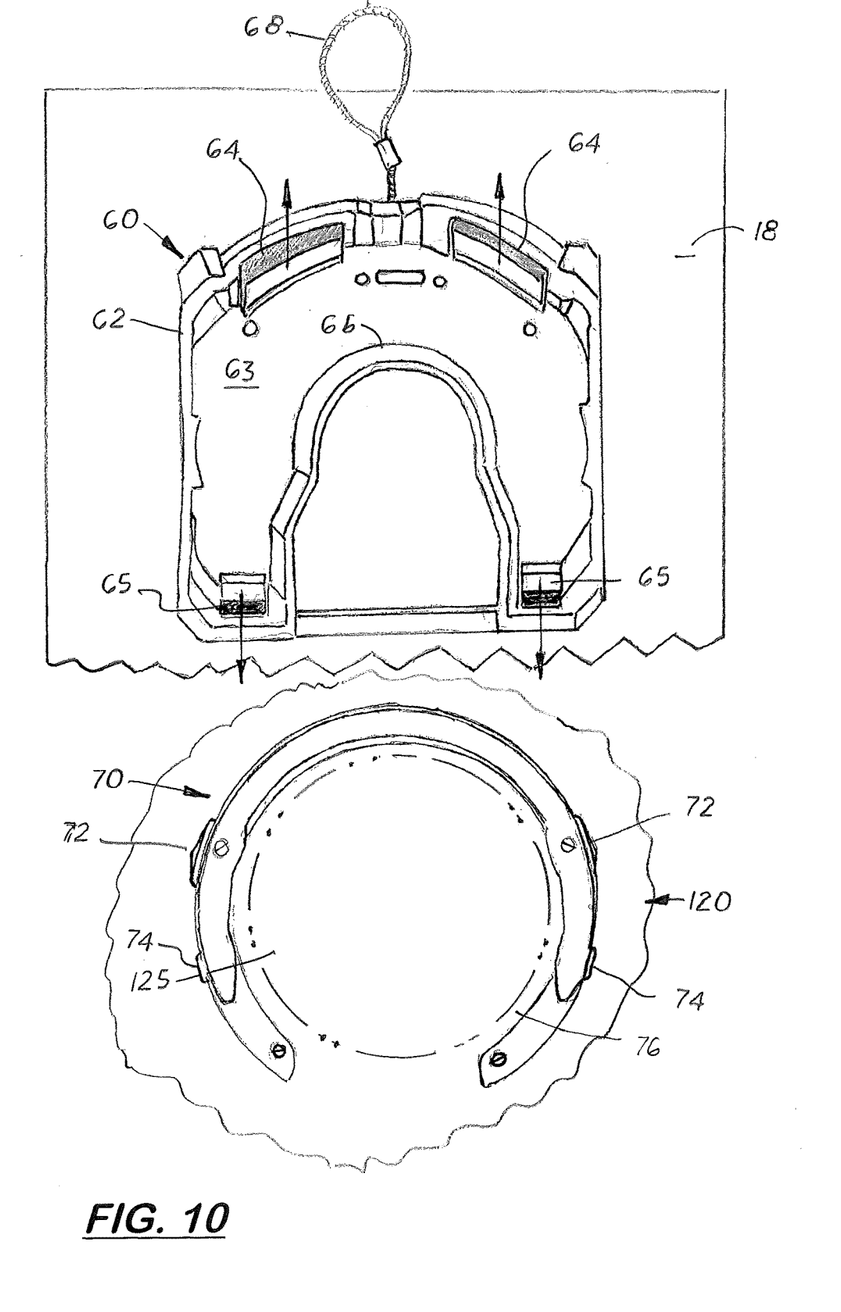
FIG. 10 is an illustration showing the coupler mounted on the bottom surface of the storage container being attached to a mounting ring attached to the top surface of a fuel tank on a motorcycle.

As shown in FIG. 10, mounted on the outside surface of the bottom panel 18 of the main box 12 is a coupler 60 configured to selectively attach to a compatible mount 70 attached to a mounting surface (indicated by reference number 120 denoting the fuel tank). The coupler 60 and mount 70 enable the storage container 10 to be selectively attached or detached to the mounting surface 120.

The coupler 60 includes two spring-biased front latches and two spring-biased rear latches 64. Formed centrally in the coupler 60 is a recessed cavity 63 configured to receive the mount 60. A release cable 68 extends from the rear end surface and connects to the biasing springs (not shown) that control the movement of the latches 64 inside the coupler 60.

Figure 11:
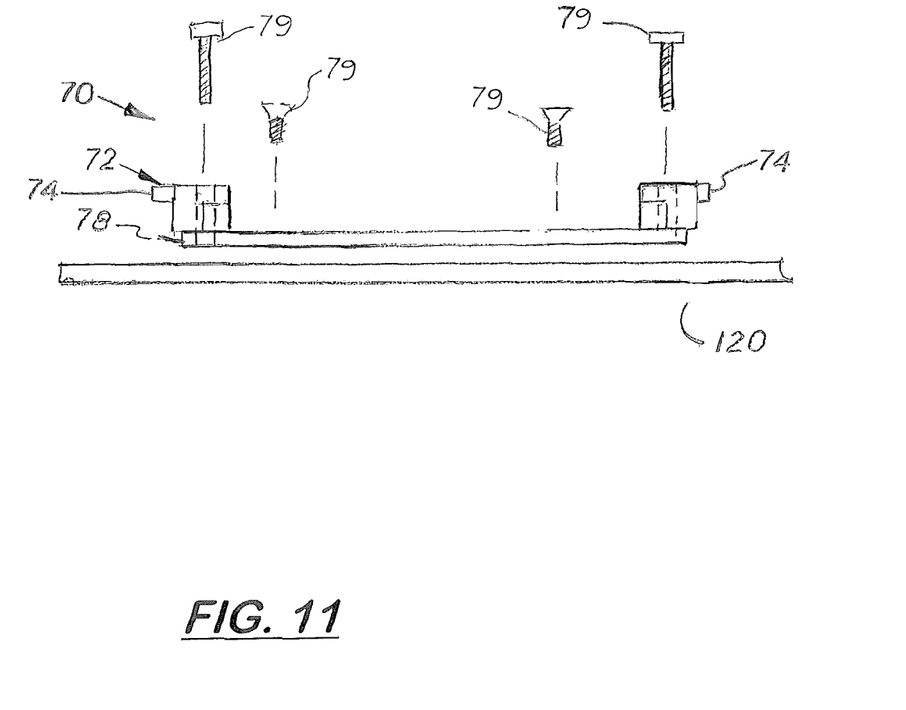
FIG. 11 is a side elevational view of the mounting ring being mounted on a fuel tank of a motorcycle.

In one embodiment, the mounting surface is the top surface of a fuel tank 120 on a motorcycle 110. The mount 70 has a horse shoe shape and is configured to fit inside the recessed cavity 63 formed on the coupler 60. The mount 70 includes front and rear lugs 72, 74 that engage the four latches 64, 65 formed on the coupler 60 to selectively connect the coupler 60 to the mount 70. During assembly, the mount 70 is attached to the top surface of the fuel tank 120 via threaded connectors 79. The fuel tank's cap 125 extends into the circular center opening 76 formed on the mount 70.

In compliance with the statute, the invention described has been described in language more or less specific. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

We claim:

1. A locking gun storage container configured for use on a substantially horizontal mounting surface, comprising:

a. a main box with an interior cavity surrounded by a bottom panel, a front panel, two side panels, and a rear panel, the bottom panel includes an inside surface and an outside surface;

b. a lid pivotally mounted on one end to the rear panel of the main box, the lid is configured to cover the interior cavity in the main box when disposed in a closed position over the main box, the lid includes an inside surface;

c. a lock mechanism between the main box and the lid that selectively locks the lid in a closed position on the main box;

d. a holster with an upper edge, a lower edge, and an interior pocket configured to hold a handgun, the holster configured to fit inside the interior cavity of the main box when the lid is closed on the main box;

e. a first hinge assembly that pivotally attaches the upper edge of the holster to the inside surface of the lid;
f. a second hinge assembly that pivotally attaches the lower edge of the holster to the inside surface of the bottom panel on the main box, the second hinge assembly configured to move the lower edge of the holster laterally over the inside surface of the bottom panel enabling the holster to be aligned inside the interior cavity of the main box when the lid is closed on the main box, the second hinge assembly also configured to move the lower edge of the holster laterally over the inside surface of the bottom panel when the lid is opened on the main box so that the holster is vertically aligned over the main box, the second hinge assembly configured to support the holster when holding a handgun vertically over the main box when the lid is moved to the open position;
g. a coupler attached to the outside surface of the bottom panel of the main box; and
h. a mount attached to a mounting surface configured to selectively attach to the coupler and hold the main box on a mounting surface.

2. The locking gun storage container, as recite in claim 1, wherein the mounting surface is a gas tank on a motorcycle.

3. The locking gun storage container, as recited in claim 1, wherein the second hinge assembly includes an elongated pivoting guide rail that includes a first end pivotally attached to the bottom panel of the main box, and a longitudinally aligned slot, the second hinge assembly also includes a guide post attached to the lower rear section of the holster configured to fit into and slide along the slot when the lid is rotated between an opened position and a closed position over the main box.

4. A locking gun storage container, comprising:
a. a main box with an interior cavity surrounded by a bottom panel, a front panel, two side panels, and a rear panel;
b. a lid configured to cover the interior cavity in the main box, the lid includes a rear surface and an inside surface;
c. a lock mechanism located between the main box and the lid that selectively locks the lid in closed position over the main box;
d. at least two spring biased hinges used to pivotally attach the rear surface of the lid to the rear panel on the main box, the spring-biased hinges configured to automatically rotate the lid to an open position over the main box when the locking mechanism is unlocked;
e. a holster with an interior pocket, an upper edge, a lower edge, and an interior pocket configured to hold a handgun;
f. a first hinge assembly attached to the lid and to the upper edge of the holster, and
g. a second hinge assembly pivotally attaching the lower edge of the holster to the bottom panel in the main box, the second hinge assembly configured to move the lower edge over the bottom panel of the main box to transversely align the holster over the main box when the lid is pivoted and moved to a closed position over the main box, the second hinge also configured to coordinate with the first hinge so that when the lid is pivoted to an open position, the upper edge is pulled upward and the lower edge of the holster automatically moves over the bottom panel of the main box to vertically align and hold the holster with a handgun in the interior pocket over the main box.

5. The locking gun storage container, as recited in claim 4, wherein the second hinge assembly includes an elongated pivoting guide rail that includes a first end pivotally attached to the bottom panel of the main box, and a longitudinally aligned slot formed on the guide rail, the second hinge also includes a guide post attached to the lower rear section of the holster, the guide post configured to fit into and slide along the slot when the lid is rotated between an opened position and a closed position over the main box.

* * * * *